United States Patent
Wooley et al.

(10) Patent No.: US 6,955,433 B1
(45) Date of Patent: Oct. 18, 2005

(54) METHODS FOR DESIGNING COMPOSITE OPHTHALMIC LENS SURFACES

(75) Inventors: C. Benjamin Wooley, Roanoke, VA (US); Pierre-Yves Gerligand, Fincastle, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/870,080

(22) Filed: Jun. 17, 2004

(51) Int. Cl.⁷ .............................................. G02C 7/02
(52) U.S. Cl. ...................................... 351/177; 351/159
(58) Field of Search ............................ 351/159, 160 R, 351/161, 164, 168, 169, 177, 178

(56) References Cited

U.S. PATENT DOCUMENTS

| | | | | |
|---|---|---|---|---|
| 5,636,338 A | * | 6/1997 | Moreton | 345/442 |
| 6,655,803 B1 | * | 12/2003 | Rubinstein et al. | 351/177 |
| 2003/0231282 A1 | * | 12/2003 | Saux et al. | 351/168 |

FOREIGN PATENT DOCUMENTS

| | | |
|---|---|---|
| EP | 295849 B1 | 12/1995 |
| WO | WO 9726579 A1 | 7/1997 |

* cited by examiner

*Primary Examiner*—Scott J. Sugarman
*Assistant Examiner*—Darryl J. Collins
(74) *Attorney, Agent, or Firm*—Lois Gianneschi

(57) ABSTRACT

The invention provides a method for designing a composite lens surface by using vector addition of the surface curvatures of two or more lens surfaces and then constructing a surface by numerical integration.

16 Claims, 9 Drawing Sheets

METHODS FOR DESIGNING COMPOSITE OPHTHALMIC LENS SURFACES

FIELD OF THE INVENTION

The present invention relates to ophthalmic lenses. In particular, the invention provides lens designs and lenses in which at least one surface of the lens is a composite of two or more surfaces.

BACKGROUND OF THE INVENTION

The use of ophthalmic lenses for the correction of ametropia is well known. For example, multifocal lenses, such as progressive addition lenses ("PALs"), are used for the treatment of presbyopia. The progressive surface of a PAL provides far, intermediate, and near vision in a gradual, continuous progression of vertically increasing dioptric power from far to near focus, or top to bottom of the lens.

Ophthalmic lens surfaces may be designed using any of a wide variety of known methods. In one such method, a progressive surface is designed by combining two progressive surfaces. More specifically, a composite surface design is computed by adding the difference in sag value between a progressive surface and a base spherical surface for each of two surfaces to a base spherical surface. However, using this method is disadvantageous in that the resulting composite surface will not have the desired surface power profile in the cases in which the base curves of the two surfaces being combined are different. Additional optimization of the composite surface typically is required to achieve the desired add power, surface power profile, and unwanted astigmatism, or astigmatism introduced or caused by one or more of the lens' surfaces, profile. Therefore, a need exists for a lens design method that permits combining two or more surfaces and that overcomes the need for additional optimization.

DESCRIPTION OF THE INVENTION AND ITS PREFERRED EMBODIMENTS

Figure 1:
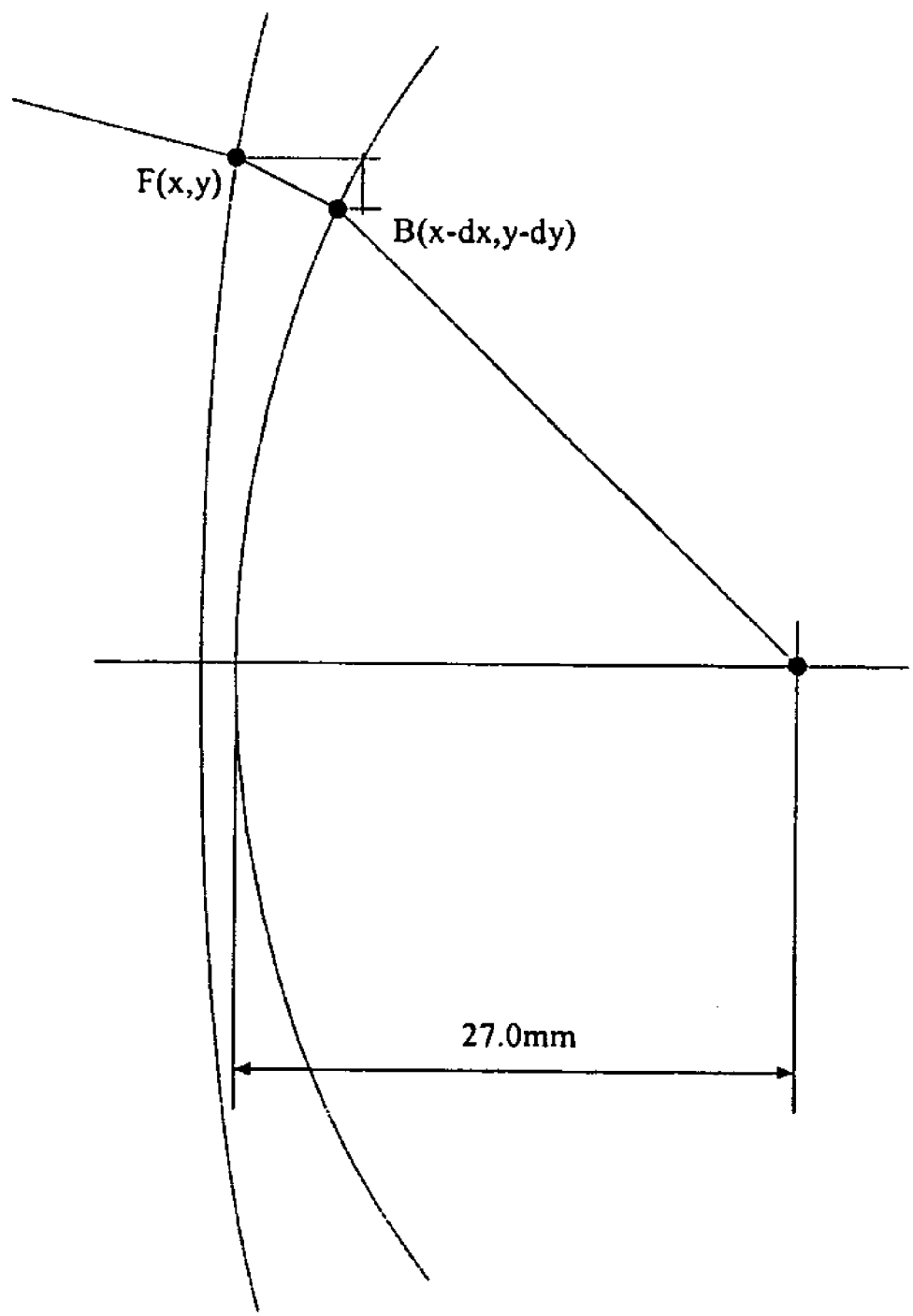
FIG. 1 is a graphical depiction of the vector addition of surface curvatures along a ray path.

In the present invention, a composite lens surface is designed by using vector addition of the surface curvatures of two or more lens surfaces and then constructing a surface by numerical integration. The method of the invention enables the combination of the two-dimensional surface power profiles of each of the surfaces eliminating the need for subsequent optimization of the composite surface, even in the case in which the base curves of the surfaces combined are different.

In one embodiment, the invention provides a method for designing an ophthalmic lens surface comprising, consisting of, and consisting essentially of: a.) calculating a principal curvature and an axis for each of two or more lens surfaces; b.) performing a vector addition of the curvatures of the surfaces; and c.) constructing a composite surface using numerical integration.

The method of the invention is useful in combining any surfaces that are continuous through the second derivative and which can be described by two principal curvatures, $k_1$ and $k_2$ and the curvature orientation θ. However, the method may find particular utility in the combining of two or more surfaces having different base curves and, in particular, combining two or more progressive surfaces with different base curves.

For purposes of the invention, by "progressive addition surface" or "progressive surface" is meant a continuous, aspheric surface having far and near vision zones and a zone of increasing dioptric power connecting the far and near vision zones. By "ophthalmic lens" or "lens" is meant any ophthalmic lens including, without limitation, spectacle lenses, contact lenses, intraocular lenses and the like. Preferably, the lens of the invention is a spectacle lens.

The composite lens surface of the invention is provided by first calculating the principal curvature and axis of each of two or more surfaces from the Gaussian curvature and Mean curvatures. The two or more surfaces themselves may be designed by any conventional design method.

One ordinarily skilled in the art will recognize that a lens surface has a power at each point on the surface, which power is scaled by the refractive index of the surface. Therefore, although the following discussion and equations refer to surface curvature, it relates as well to the surface power except for the scale factor. The principal curvature and axis of each surface may be calculated as follows.

$$k_1 = H + \sqrt{H^2 - K} \quad \text{(I)}$$

$$k_2 = H - \sqrt{H^2 - K} \quad \text{(II)}$$

$$H = \frac{e \cdot G - 2 \cdot f \cdot F + g \cdot E}{2 \cdot (E \cdot G - F^2)} \quad \text{(III)}$$

$$K = \frac{e \cdot G - f^2}{E \cdot G - F^2} \quad \text{(IV)}$$

$$\theta = \frac{2 \cdot f \cdot \sqrt{e \cdot g}}{eg - E.G} \quad \text{(V)}$$

wherein $k_1$ is the maximum curvature;
$k_2$ is the minimum curvature;
H is the Mean curvature;
K is the Gaussian curvature;
E, F, and G are the coefficients of the first fundamental form;
e, f, and g are the coefficients of the second fundamental form; and
θ is the curvature orientation.

In the second step of the method of the invention, the surface curvatures of each of the surfaces then may be added point-by-point on the surface as follows. The surface curvature at a point P may be described by the following:

$$Pwr = \frac{k_1 + k_2}{2} \quad \text{(VI)}$$

$$A_0 = \left(\frac{k_1 + k_2}{2}\right) \cdot \cos(2 \cdot \theta)$$

$$B_0 = \left(\frac{k_1 + k_2}{2}\right) \cdot \sin(2 \cdot \theta)$$

$$C(\alpha) = Pwr + A_0 \cdot \cos(2 \cdot \alpha) + B_0 \cdot \sin(2 \cdot \alpha)$$

wherein $k_1$ and $k_2$ are the maximum and minimum curvatures, respectively;
$\theta$ is the curvature orientation;
$C(\alpha)$ the curvature value at the orientation $\alpha$;
$A_0$ is the horizontal component of the toric component of the curvature;
$B_0$ is the vertical component of the toric component of the curvature; and
Pwr is the mean curvature value.

The values of $k_1$ and $k_2$ and $\theta$ are all functions of the x, y position on the surface.

The total curvature of the composite surface at a given point and orientation may be calculated as follows:

$$Ct(\alpha) = \sum_i Pwr_i + \left[\sum_i A_i\right] \cdot \cos(2 \cdot \alpha) + \left[\sum_i B_i\right] \cdot \sin(2 \cdot \alpha) \quad \text{(VII)}$$

wherein i defines the number of curvatures to be combined. The orientation of the total curvature may be given by:

$$\theta_i = 0.5 \cdot \arctan\left[\frac{\left[\sum_i B_i\right]}{\left[\sum_i A_i\right]}\right] \quad \text{(VIII)}$$

The relationship between the curvature, C, and the surface sag, Z, in one dimension is:

$$\frac{\partial^2 Z}{\partial r^2} = C * \left[1 + \left[\frac{\partial Z}{\partial r}\right]^2\right]^{\frac{3}{2}} \quad \text{(IX)}$$

wherein C is the curvature in the direction of r and r is in the plane perpendicular to Z. The composite surface given by Equations VII and VIII can be reconstructed by solution of Equation IX in two dimensions.

For example, one method for solving Equation IX using two numerical integrations is known and is disclosed in Elster, C., Gerhardt J., Thomsen-Schmidt P., Schulz M., Weingartner I., "Reconstructing Surface Profiles From Curvature Measurements," Optik 113, No. 4, 154–158, (2002). The integrations maybe performed using the trapezoid method or Simpson's method. To extend this solution to two dimensions, preferably polar coordinates, r and $\theta$, are used with the double integration being performed along r from the center of the composite surface to its edge. The angle $\theta$ is incremented from 0 to 360 degrees to provide reconstruction of the entire surface. Any of a wide variety of fitting methods may be used including, without limitation, local polynomials or b-splines, to convert the surface from polar coordinates to Cartesian coordinates.

The base curvature of the resulting composite surface may be altered using the above-described method by adding or subtracting a constant curvature. Thus, the base power of the surface may be changed while the add power and the unwanted astigmatism, or unwanted cylinder, of the surface is maintained. For example, a surface with a base power of 2.0 diopters and an add power of 1.5 diopters can have added to it a constant curvature with a power of 4.0 diopters to provide a new surface with a base power of 6.0 diopters and an add power of 1.5 diopters. By contrast, addition of the sag values would result in an add power of 1.39 diopters. The following table provides additional examples using a variety of base powers.

| Base Power | Constant Curvature | Add Power Sag Addition | Add Power Curvature Addition |
|---|---|---|---|
| 2.0 diopters | 4.0 diopters | 1.5 diopters | 1.5 diopters |
| 3.0 diopters | 4.0 diopters | 1.48 diopters | 1.5 diopters |
| 4.0 diopters | 4.0 diopters | 1.46 diopters | 1.5 diopters |
| 5.0 diopters | 4.0 diopters | 1.43 diopters | 1.5 diopters |
| 6.0 diopters | 4.0 diopters | 1.39 diopters | 1.5 diopters |
| 7.0 diopters | 4.0 diopters | 1.35 diopters | 1.5 diopters |
| 8.0 diopters | 4.0 diopters | 1.30 diopters | 1.5 diopters |

In cases in which multiple individual progressive surfaces of differing designs are used in the design of the composite surface, it may be necessary to scale the x-y values for one or each of the individual surfaces relative to the final, composite surface. On case in which scaling may be desirable is the case in which two progressive surface are combined, one surface of which was designed to be placed on the front, or object side, surface of a lens and the second surface was designed to be placed on the back, or eye side, surface of the lens. Scaling the surfaces may be performed so that the vector addition of the surfaces is performed along the path of lines which connect each respective surface to the center of rotation of the eye a shown in FIG. 1, rather than at the same coordinates on the individual surfaces.

Scaling may also be necessary when a composite design having either a longer or shorter channel length than the individual surfaces or movement in the peaks of unwanted astigmatism is desired. In this case, the scaling need not be linear and may be different in the x than in the y plane or it may have no symmetry at all.

The designs of the individual progressive surfaces used in designing the composite surface may be either hard, soft, or a combination thereof. The composite progressive addition surface design may be used for the convex or concave surface of a lens or as an interface between the outer concave and outer convex surfaces of the lens. One or more than one composite progressive addition surface design may be used to form the lens. The one or more composite surfaces may be combined with one or more progressive surfaces to form the lens. In embodiments in which a composite or progressive addition surface is an interface layer between the concave and convex surfaces, preferably the materials used for the interface layer and surfaces are of refractive indices that differ by at least about 0.01, preferably at least about 0.05, more preferably at least about 0.1. Other surfaces, such as spheric and toric surfaces, designed to adapt the lens to the ophthalmic prescription of the lens' wearer may be used in combination with, or in addition to, the composite progressive addition surface.

In the case in which more than one composite progressive surface is used to form the lens, or the composite surface used in combination with one or more progressive surface, the dioptric add power of each of the surfaces is selected so that the combination of their dioptric add powers results in a value substantially equal to the value needed to correct the lens wearer's near vision acuity. The dioptric add power of each of the surfaces may be from about +0.01 diopters to about +3.00 diopters, preferably from about +0.25 diopters to about +2.50 diopters, more preferably about +0.50 to about +2.00 diopters. Similarly, the distance and near dioptric powers for each surface are selected so that the sum of the powers is the value needed to correct the wearer's distance and near vision. Generally, the distance curvature for each surface will be within the range of about 0.25 diopters to about 8.50 diopters. Preferably, the curvature of the distance zone of a concave surface may be about 2.00 to about 5.50 diopters and for a convex surface, about 0.5 to about 8.00 diopters. The near vision curvature for each of the surfaces will be about 1.00 diopters to about 12.00 diopters.

The composite progressive addition surfaces, and lenses incorporating these surfaces, may be formed by any convenient method such as, without limitation, thermoforming, molding, grinding, free-form grinding, free-form cutting, casting or the like. In a preferred method, free-form grinding or free-form cutting is used.

In using the preferred manufacturing methods, a composite surface that is the combination of a base sphere or toric and a progressive surface may form the back, or eye side, surface of the lens. Alternatively, a spherical or aspherical surface form one surface of the lens and the other lens surface is a composite surface that combines a sphere, asphere, or toric surface with a progressive surface. The composite surface may be created by adding a two-dimensional file of sag values representing the progressive portion of the surface to the base sphere, asphere, or toric surface. However, the two-dimensional file is only accurate when the base curvature for the surface it is being added back to is the same as the original base curve for the two-dimensional file was extracted. Thus, multiple files are often required to cover a range of base curves or toric curves.

The method of the invention permits the use of a single, two-dimensional file to be defined which file is the progressive power profile desired for the surface. This file provides the Pwr, $A_0$, and $B_0$ from Equation VI for the progressive portion of the surface as a function of x and y. This progressive surface may be combined with the required sphere, asphere or toric surface to give the desired lens prescription. Therefore, using the method of the invention permits reduction in the number of files required to manage a full range of prescriptions while providing increased accuracy and better performance over the range.

Additionally, for any given progressive design, multiple progressive surfaces are required to cover the full range of sphere and add values required for a commercial product. For example, for a front surface progressive lens, the design will include 6 or 7 front base curves with 9 or more different add powers for each base curve to cover the full range. Propagating any one add power across the range of base curves requires optimization of each base curve separately because the progressive surface design cannot simply be added to the other base curves given the difference from the base curve for which it is designed compared to the base curves across the range. Using the method of the invention, the design for one surface may be defined in terms of its vector power profile. That power profile may be added to the various base curves providing an efficient method for propagating the design across the base curves while ensuring similar performance base curve to base curve.

By way of example, a 2.0 diopters add power design is optimized for a 5.0 base curve intended to cover sphere powers form −1.0 to +1.0 diopters. To use the same progressive design on a 3.25 diopters base curve, a spherical surface with a power of −1.75 diopters may be added to the 5.0 diopters sphere, 2.0 diopters add design resulting in a 3.25 diopters sphere, 2.0 diopters add design with substantially the same progressive design performance as the 5.0 diopters base curve design.

Additionally, it may be desirable to have differing amounts of asphericity depending on the base curve. In this case, the progressive, sphere, and aspheric surfaces may be added together using the method of the invention to provide progressive designs with substantially the same progressive design performance with differing base curves and differing amounts of asphericity.

The invention will be clarified by consideration of the following, non-limiting example.

EXAMPLE

Figure 2:
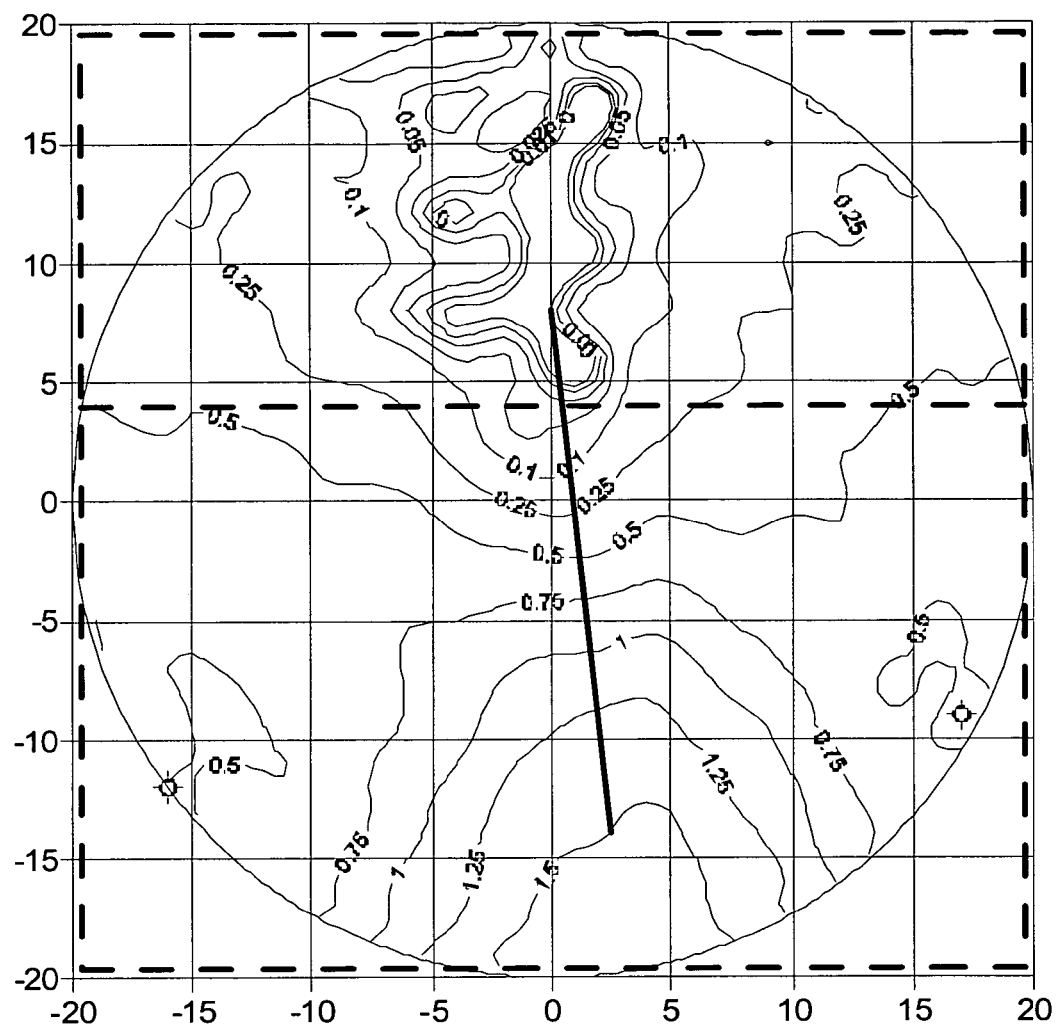
FIG. 2 is a mean sphere power profile for a first conventional lens.
Figure 3:
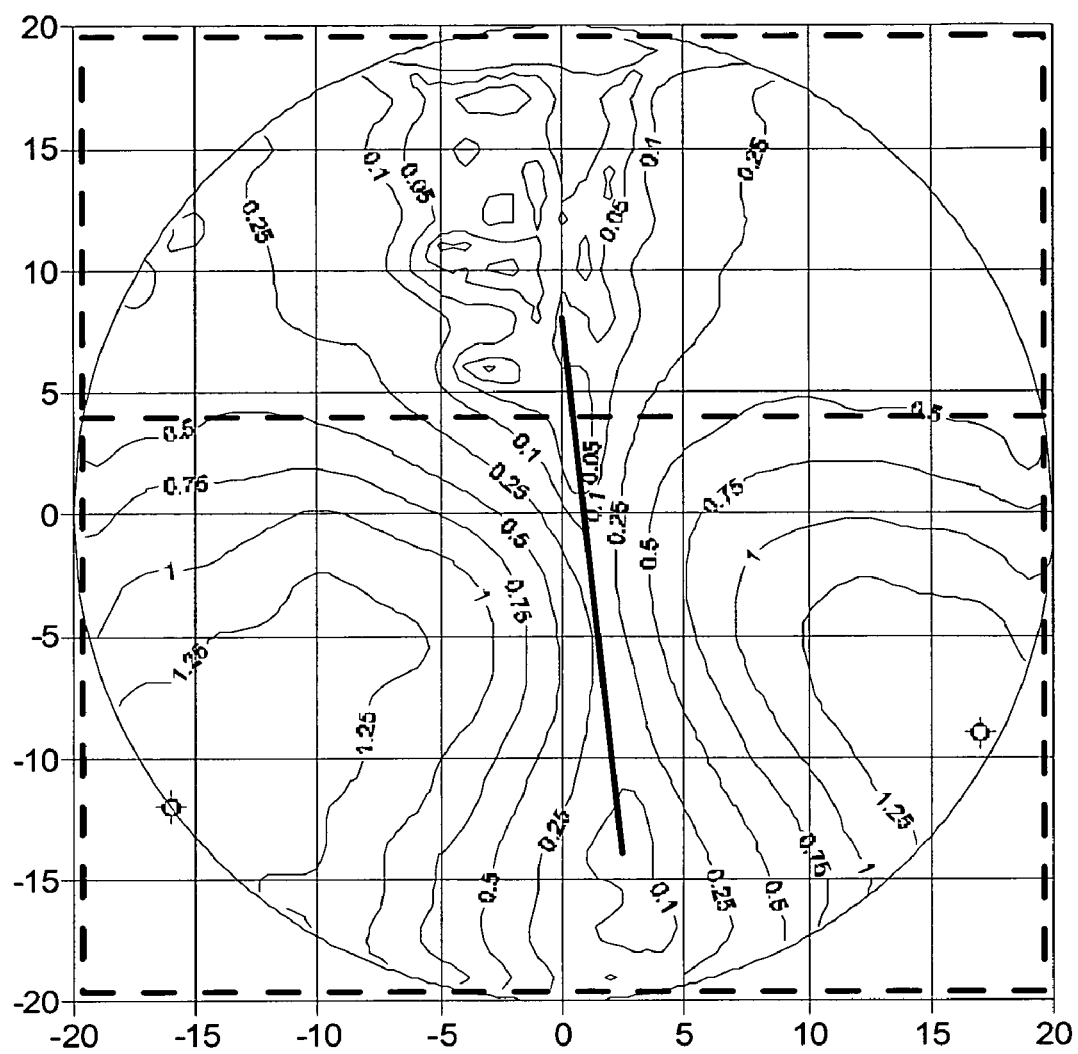
FIG. 3 is an unwanted cylinder profile for a first conventional lens.
Figure 4:
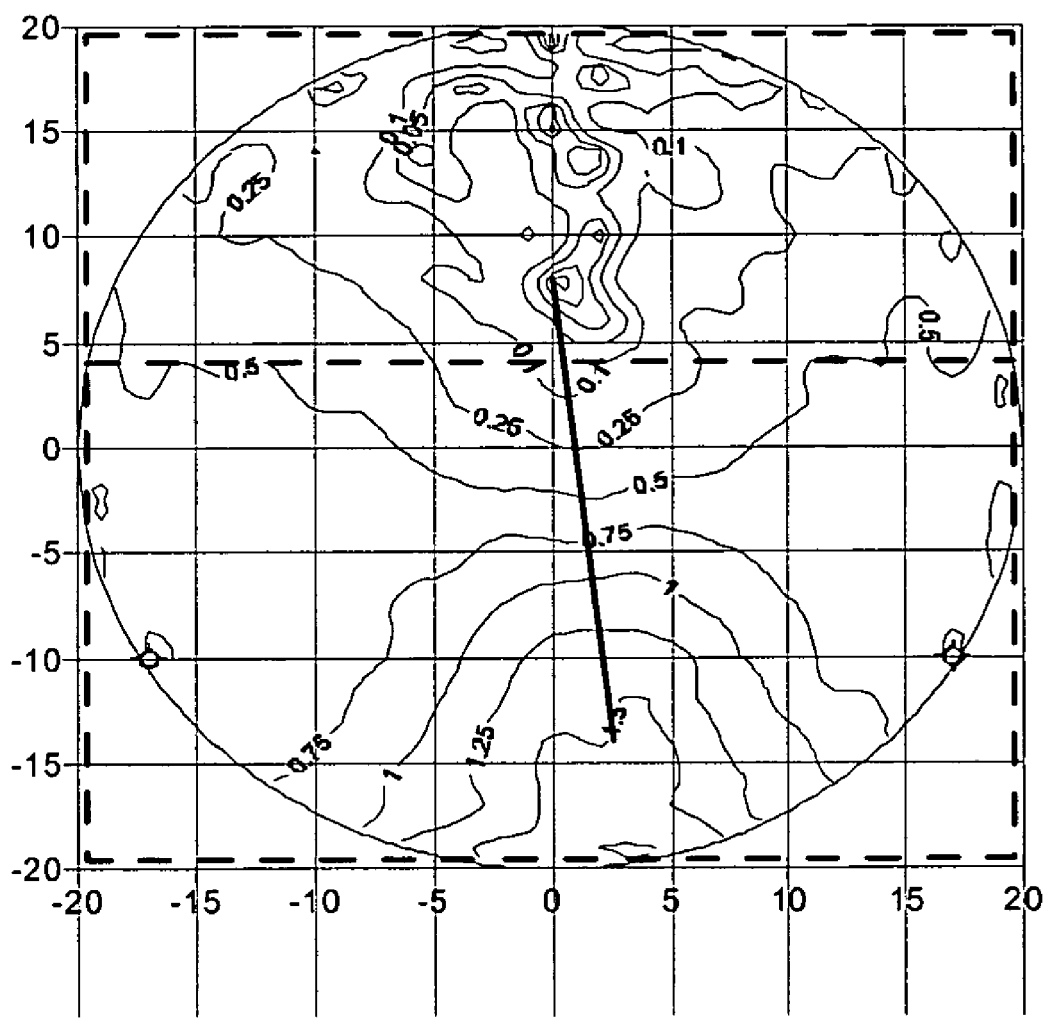
FIG. 4 is a mean sphere power profile for a second conventional lens.
Figure 5:
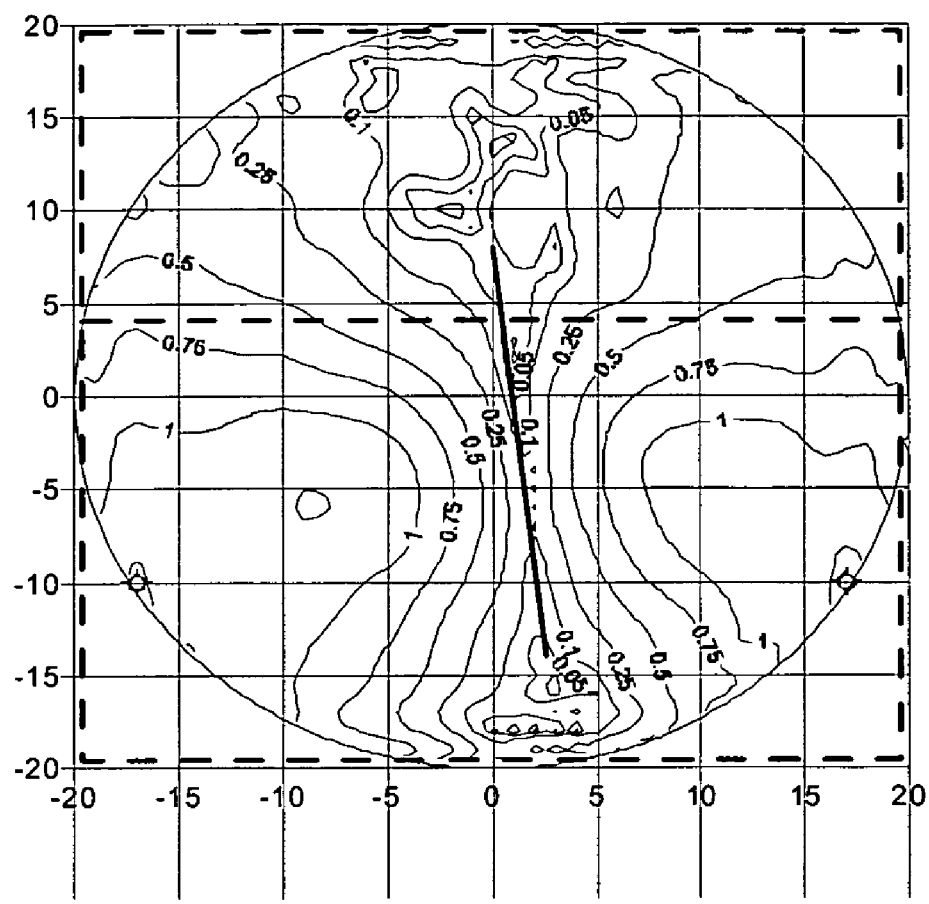
FIG. 5 is a unwanted cylinder profile for a second conventional lens.

A Varilux COMFORT™ lens with a 2.0 diopters base power and a 1.5 diopters add power was measured using a coordinate measuring machine. The power and unwanted cylinder profiles are shown as FIGS. 2 and 3. A Varilux PANAMIC™ lens with a 5.5 diopters base power and a 1.5 diopters add power was measured and the power and unwanted cylinder profiles are shown in FIGS. 4 and 5.

Figure 6:
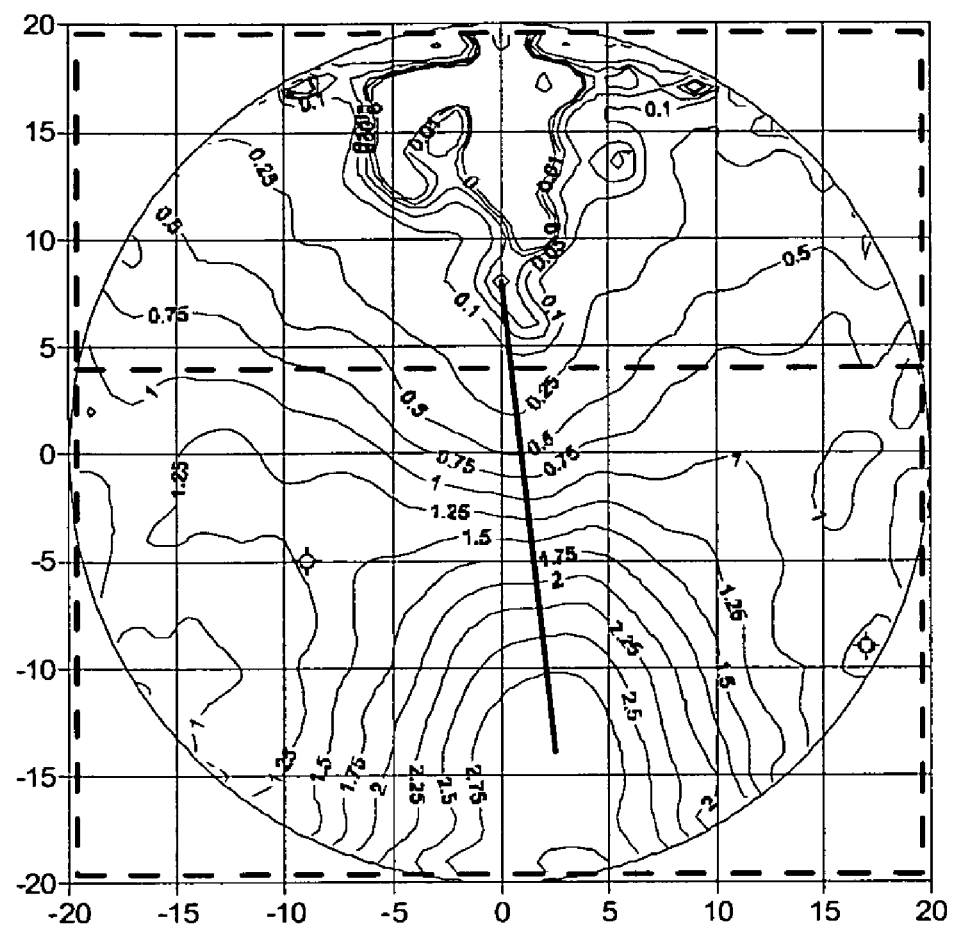
FIG. 6 is a mean sphere power profile for a composite surface created using sag addition.
Figure 7:
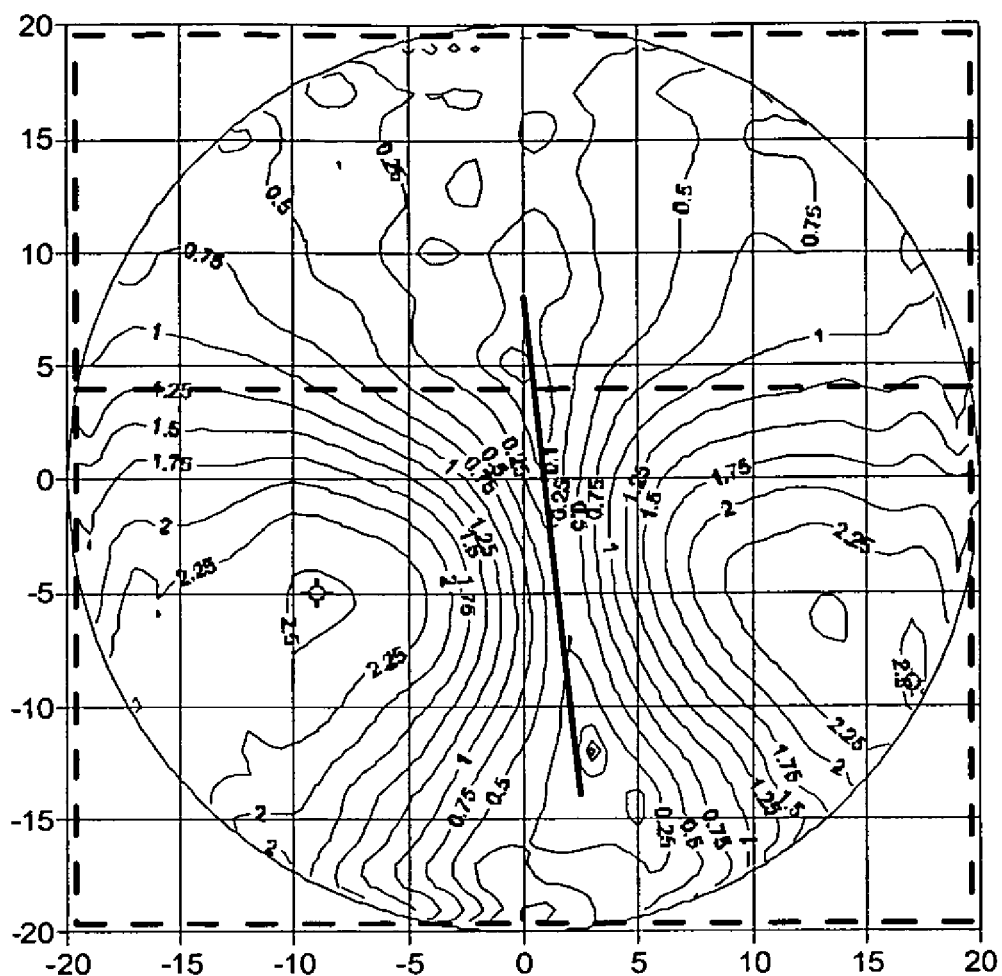
FIG. 7 is an unwanted cylinder profile for a composite surface created using sag addition.
Figure 8:
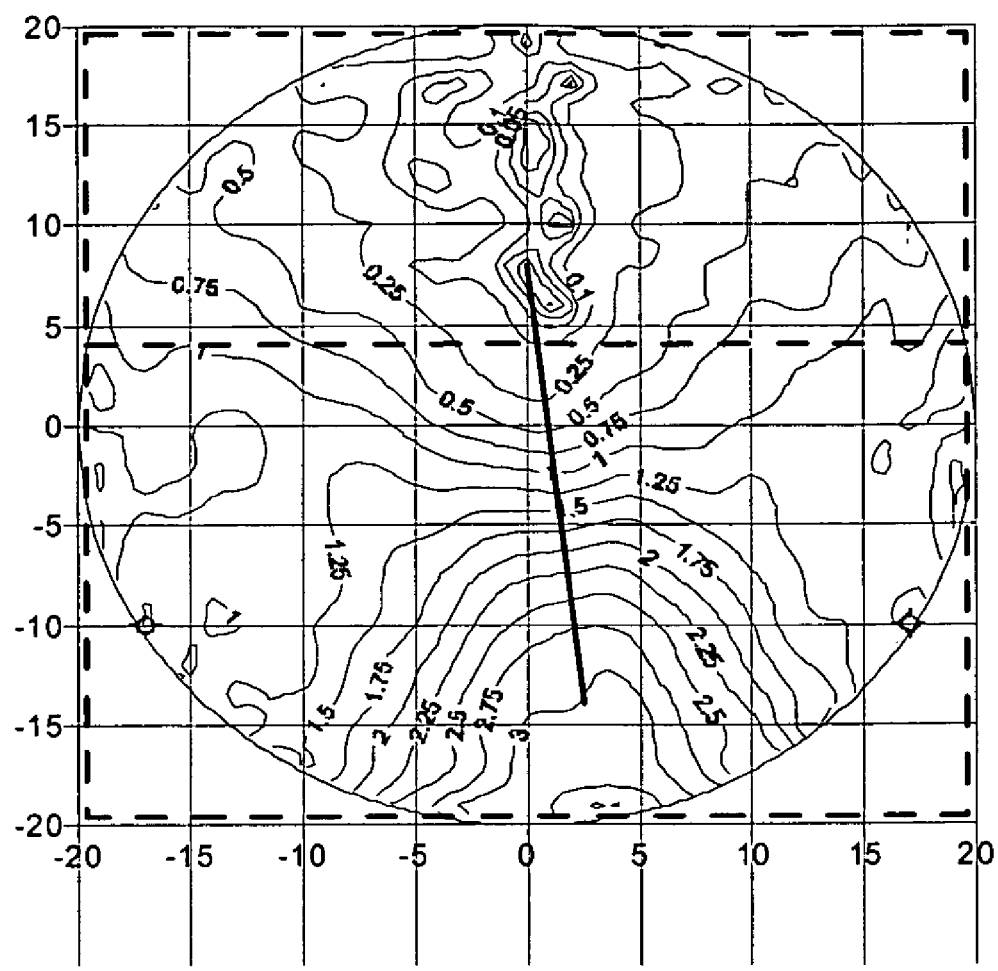
FIG. 8 is a mean sphere power profile for a composite surface created using the method of the invention.
Figure 9:
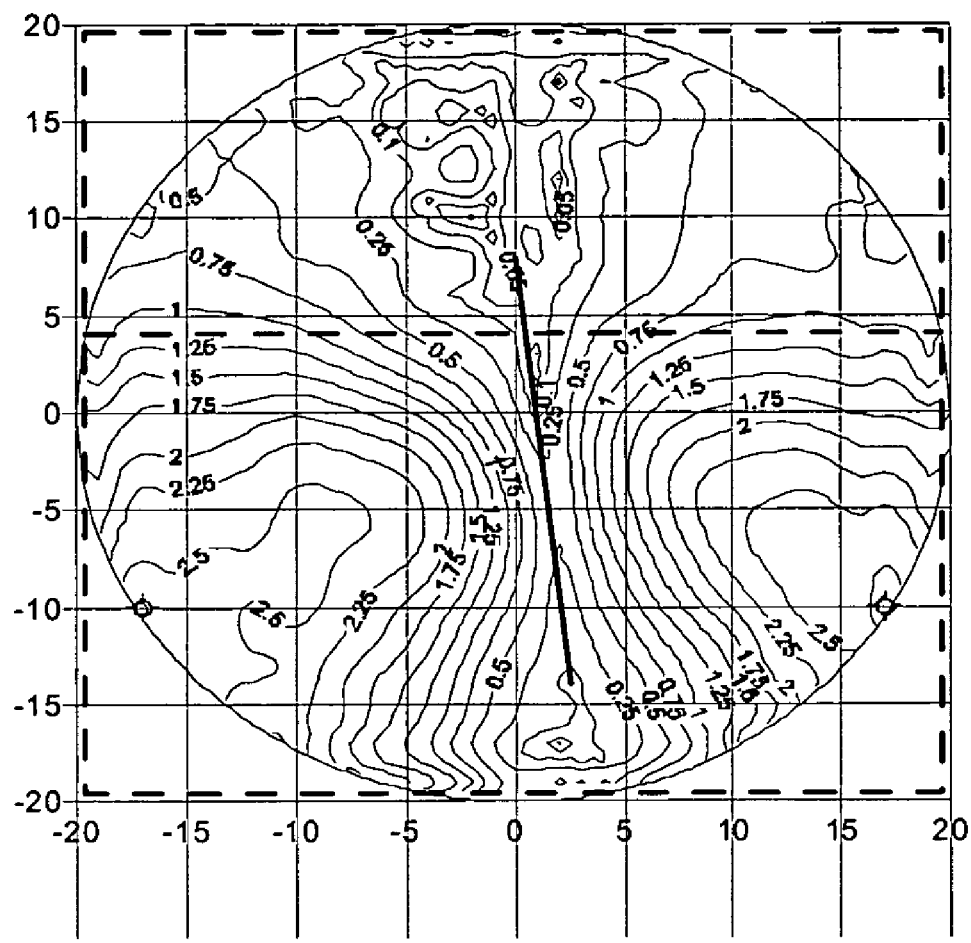
FIG. 9 is an unwanted cylinder power profile for a composite surface created using the method of the invention.

A composite surface was to be created with a base power of 6.0 diopters and a target add power of 3.0 diopters. The surface was first created by sag addition of the measured COMFORT and PANAMIC surfaces. The surface had an add power of 2.89 diopters. The power and unwanted cylinder profiles for this surface are shown as FIGS. 6 and 7, respectively. The surface was then created using the curvature addition method of the invention. The resulting lens had an add power of 3.0 diopters. The power and unwanted cylinder profiles for this surface are shown as FIGS. 8 and 9.

What is claimed is:

1. A method for designing an ophthalmic lens surface, comprising the steps of:
    a.) calculating a principal curvature and an axis for each of two or more lens surfaces;
    b.) performing a vector addition of the curvatures of the surfaces; and
    c.) constructing a composite surface using numerical integration.

2. The method of claim 1, wherein each of the two or more surface has a different base curve.

3. The method of claim 1, wherein each of the two or more surfaces comprise a progressive surface.

4. The method of claim 3, wherein each of the progressive surfaces has a different base curve.

5. The method of claim 2, further comprising the step of scaling the x-y values for one of the two or more surfaces in relation to the composite surface.

6. The method of claim 2, further comprising the step of scaling the x-y values for each of the two or more surface in relation to the composite surface.

7. The method of claim 4, further comprising the step of scaling the x-y values for one of the two or more surfaces in relation to the composite surface.

8. The method of claim 4, further comprising the step of scaling the x-y values for each of the two or more surface in relation to the composite surface.

9. The method of claim 5, wherein the scaling is carried out by vector addition of the surface along a path of each of a plurality of lines connecting the surface to a center of rotation of an eye.

10. The method of claim 6, wherein the scaling is carried out by vector addition of each of the two or more surface along a path of each of a plurality of lines connecting the surfaces to a center of rotation of an eye.

11. The method of claim 7, wherein the scaling is carried out by vector addition of the surface along a path of each of a plurality of lines connecting the surface to a center of rotation of an eye.

12. The method of claim 8, wherein the scaling is carried out by vector addition of each of the two or more surface along a path of each of a plurality of lines connecting the surfaces to a center of rotation of an eye.

13. A lens produced by the method of claim 1.

14. A lens produced by the method of claim 2.

15. A lens produced by the method of claim 3.

16. A lens produced by the method of claim 4.

* * * * *